United States Patent [19]

Kuribayashi et al.

[11] 4,259,602
[45] Mar. 31, 1981

[54] ELECTROMAGNETIC LINEAR-MOTION DEVICE

[75] Inventors: Hiroshi Kuribayashi; Atsuo Ikeda, both of Tokorozawa, Japan

[73] Assignee: Pioneer Electronic Corporation, Tokyo, Japan

[21] Appl. No.: 30,138

[22] Filed: Apr. 16, 1979

[30] Foreign Application Priority Data

Apr. 20, 1978 [JP] Japan .................. 53/46799

[51] Int. Cl.³ ............................................. H02K 33/00
[52] U.S. Cl. ....................................................... 310/12
[58] Field of Search ...................... 310/12–14, 310/15

[56] References Cited

U.S. PATENT DOCUMENTS

| 2,409,857 | 10/1946 | Hines et al. | 310/15 |
| 3,575,650 | 4/1971 | Fengler | 310/12 |
| 3,707,924 | 1/1977 | Barthalon et al. | 310/120 |
| 4,051,398 | 9/1977 | Kondo | 310/12 |

Primary Examiner—Donovan F. Duggan
Attorney, Agent, or Firm—Michael J. Striker

[57] ABSTRACT

An electromagnetic linear-motion device in which a field magnet unit mounted on a movable unit slidably supported on elongated guide members is movable longitudinally between and along a pair of spaced parallel stationary linear armatures so that any objectionable forces producing increased frictional forces between the movable unit and the guide members are cancelled by each other.

4 Claims, 4 Drawing Figures

4,259,602

ELECTROMAGNETIC LINEAR-MOTION DEVICE

IN VIEW OF THIS INVENTION

The present invention relates to an electromagnetic linear-motion device. While an electromagnetic linear-motion device herein propose maybe usefuly in various fields in which a linear, reciprocating invention is used as a electromagnetic output or input responsive to of producing a corresponding signal, such a device is useful especially as a linear motion for the driving of a linear tracking arm in a video or audio displayer.

BACKGROUND OF THE INVENTION

A known electromagnetic linear-motion device proposed by the applicant of the present invention; each device carries from the linear tracking arm of a video or audio displayer is such that a slider movable on a guide bar is driven to member on the guide bar by the interaction between the constant flux field establishing the permanent magnets carried on the slider end a variable control flux field indicated a by a control coil while on a magnetic core member extending in parallel with the part of this lighter. When the control coil is imparted by a control current, which only a variable control field is induced by the control coil between the magnetic coil member elevated at parallel with the back of the slider is magnetize opposite poles in the longitudinal ends thereof. As the permanent magnets on the lighter are moved closer to work on the longitudinal end of the magnetic core member 22, therefore, each of the permanent magnets on the slider is suggested to a repulsive or magnetomotive force imparting from the magnetic field ends appearing in the region of longitudinal end of the coil member and produces a decrease friction force between the slider and the guide bar supporting slide. The friction force impairs the field magnet of the movement of the slider on the guide bar and makes the slider less responsive to the signal current to be supplied to the control coil.

SUMMARY OF THE INVENTION

The present invention contemplates elimination of such a drawback inherent in an electromagnetic linear-motion device of the described basic construction and it is, accordingly, a prime object of the present invention to provide an improved electromagnetic linear-motion device in which two stationary armatures are arranged in parallel on both sides of the field magnet unit on the slider or movable unit so that the slider or movable unit is subjected to a minimum of frictional force between the movable unit and the guide means supporting the movable unit.

In accordance with the present invention, such an object of the invention is accomplished dasically in an electromagnetic linear-motion device comprising, in combination, at least one longitudinally elongated guide member, a movable unit mounted on the guide member and movable longitudinally of the guide member, a field magnet unit which is securely mounted on the movable unit, a pair of magnetic core members which are longitudinally elongated substantially in parallel with the aforesaid guide member and which are spaced apart from each other to form an air gap between the field magnet unit and each of the core members, and coils which are helically wound in opposite directions to each other on the magnetic core members, respectively.

BRIEF DESCRIPTION OF THE DRAWINGS

The drawback previously pointed out of a prior-art electromagnetic linear-motion device and the features and advantages of an electromagnetic linear-motion device proposed by the present invention will be more clearly understood from the following description taken in conjunction with the accompanying drawings, in which.

DETAILED DESCRIPTION OF THE PRIOR ART

Figure 1:
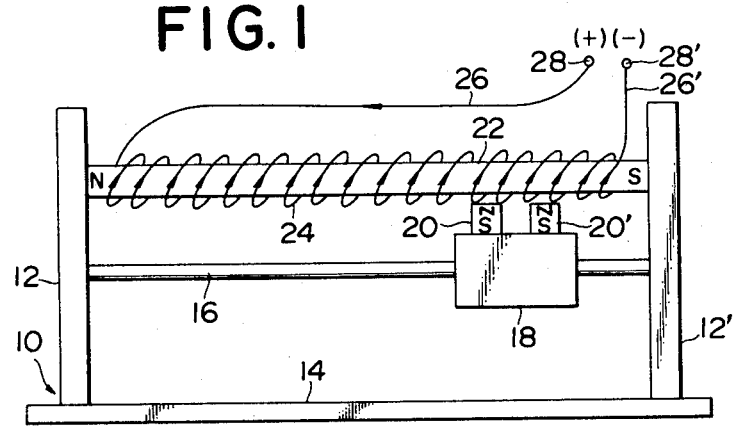
FIG. 1 is a side elevation view schematically showing a representative example of an electromagnetic linear-motion device proposed by the applicant of the present invention.

Referring to FIG. 1 of the drawings, an electromagnetic linear-motion device of the character to which the present invention appertains comprises a stationary support structure 10 including a pair of spaced parallel end plates 12 and 12' upstanding from a horizontal base plate 14. An elongated guide bar 16 is securely connected at the opposite axial ends thereof to these end plates 12 and 12' of the support structure 10 and longitudinally extends in parallel with the horizontal base plate 14. A slider 18 is mounted on this guide bar 16 and is longitudinally slidable on and along the guide bar 16 between the end plates 12 and 12'. The slider 18 has fixedly mounted on the top of it two permanent magnets 20 and 20' each having the opposite poles at the upper and lower ends thereof. In the arrangement herein shown, each of the permanent magnets 20 and 20' is assumed to have north and south poles at the upper and lower ends, respectively, thereof as indicated by N and S. An elongated core member 22 of a magnetic material extends in parallel with and above the guide bar 16 and is securely connected at the opposite axial ends thereof to the side plates 12 and 12' of the support structure 10. The permanent magnets 20 and 20' on the guide bar 16 have their respective upper north-pole ends slightly spaced apart downwardly from the core member 22 and, thus, form an air gap between the core member 22 and the north-pole end of each of the magnets 20 and 20'. A control coil 24 is helically wound on and around the core member 22 and is connected at its ends to lead wires 26 and 26'. The lead wires 26 and 26' in turn are connected to positive and negative terminals 28 and 28', respectively, for further connection to any source (not shown) of signal current. The magnetic core member 22 and the coil 24 wound thereon constitute in combination a stationary linear armature while the two permanent magnets 20 and 20' on the slider 18 constitute a field magnet unit establishing a constant flux field between the field magnet unit and the linear armature.

In the arrangement shown in FIG. 1, the control coil 24 is shown to be wound on the magnetic core member 22 in a direction in which the current to flow through the coil 24 from the positive terminal 28 to the negative terminal 28' passes through each turn of the coil from the left to the right in the air gap between the core member 22 and each of the magnets 20 and 20' as indicated by arrows when viewed axially of the core member 22 from the side of the end plate 12 of the support structure 10. When, thus, a voltage is produced between the positive and negative terminals 28a and 28b, a current flows through the control coil 24 in the direction of the arrows so that a magnetomotive force directed leftwardly of the core member 22 is produced in the coil 24 by the interaction between the constant magnetic field extending from each of the permanent magnets 20 and 20' into the core member 22 through the air gap therebetween and the variable control field induced by the current which transversely cuts across the constant magnetic field. Since the control coil 24 is fast on the stationary core member 22, the magnetomotive force thus produced in the coil 24 is reacted upon by the field magnet unit on the slider 18 and, as a consequence, the slider 18 is caused to move rightwardly on the guide bar 16. If the direction of the control field is reversed, as accomplished by a reversal of the direction of the current to flow through the control coil 24, the stationary armature is subjected to a magnetomotive force directed rightwardly of the core member 22 and, as a consequence, the slider 18 is moved leftwardly on the guide bar 16 as will be readily understood.

When a current is flowing through the control coil 24 in the linear-motion device thus constructed and operative, the core member 22 wrapped with the coil 24 is magnetized and becomes a bar magnet having opposite poles at the axial ends thereof as indicated by N and S on the core member 22. As the slider 18 is moved closer to one end plate 12 of the support structure 10, therefore, the permanent magnets 20 and 20' on the slider 18 are urged downwardly away from the core member 22 under the influence of a repulsive force produced between each of the magnets 20 and 20' and the north-pole end portion of the core member 22. As the slider 18 approaches the other end plate 12' of the support structure 10, the permanent magnets 20 and 20' on the slider 18 are urged upwardly toward the core member 22 under the influence of an attractive force produced between each of the magnets 20 and 20' and the south-pole end portion of the core member 22. The slider 18 is therefore forced downwardly or upwardly against the guide bar 16 with a force which progressively increases as the slider 18 is moved closer to each axial end of the guide bar 16. Due to the frictional force thus produced between the guide bar 16 and the slider 18, the slider is disabled from being moved smoothly on the guide bar 16 and accordingly from being faithfully responsive to the signal current supplied to the control coil 24 from the external source (not shown).

DESCRIPTION OF THE PREFERRED EMBODIMENT

The present invention contemplates elimination of such a drawback encountered in an electromagnetic linear-motion device of the described basic nature.

Figure 2:
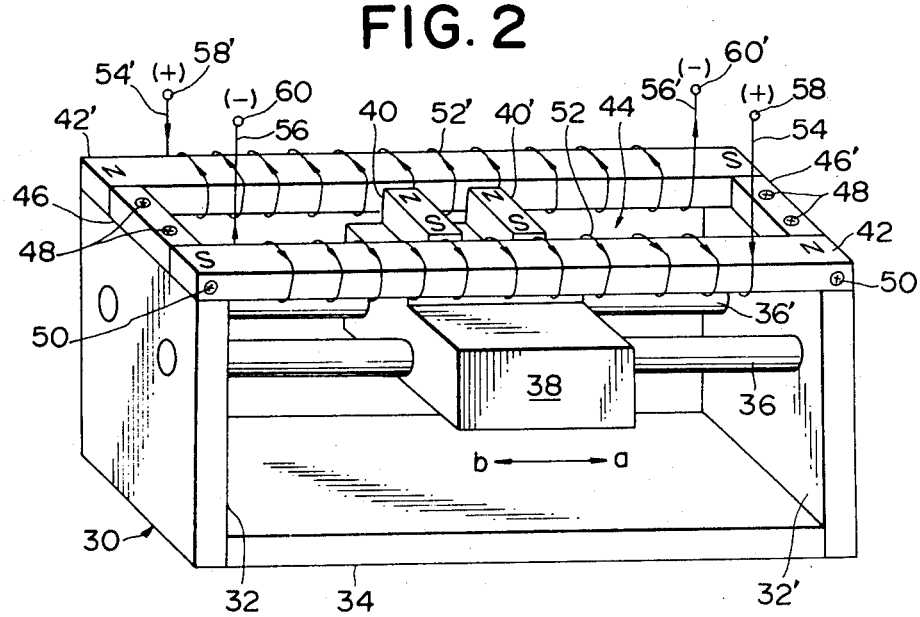
FIG. 2 is a perspective view showing a preferred embodiment of an electromagnetic linear-motion device according to the present invention.

Referring to FIG. 2 of the drawings, an electromagnetic linear-motion device embodying the present invention comprises a stationary support structure 30 having a pair of spaced parallel, vertical end plates 32 and 32' and a substantially horizontal elongated base plate 34 secured along the longitudinal ends thereof to respective lower end portions of the end plates 32 and 32' by suitable fastening means (not shown). The general construction of the support structure 30 herein shown is merely by way of example and is, for this reason, not limitative of the subject matter of the present invention. The support structure 30 as a whole or at least each of the end plates 32 and 32' thereof is preferably constructed of a non-magnetic material. A pair of elongated guide members 36 and 36' are securely connected each at one axial end to the end plate 32 and at the other axial end to the plate 32' by suitable fastening means (not shown). The guide members 36 and 36' extend substantially horizontally in longitudinal directions of the support structure 30 and are spaced apart in parallel from each other throughout the lengths thereof. Each of the guide members 36 and 36' is herein assumed to have a circular cross section by way of example but may be otherwise configured in cross section if desired.

A slider or movable unit 38 is mounted on these guide members 36 and 36' by means of suitable bearings (not shown) and is movable longitudinally on and along the guide members 36 and 36' between the end plates 32 and 32' of the support structure 30. The movable unit 38 has fixedly mounted thereon two permanent magnets 40 and 40' which are spaced apart substantially in parallel from each other in a longitudinal direction of the support structure 30 and which have respective magnetic axes substantially at right angles to the longitudinal direction of the support structure 30. A pair of elongated core members 42 and 42' each constructed of a magnetic material such as soft iron longitudinally extend substantially in parallel with the guide members 36 and 36' and are fast at their respective longitudinal ends on the upper faces of the end plates 32 and 32' of the support structure 30. The magnetic core members 42 and 42' are spaced apart substantially in parallel from each other in a lateral direction of the support structure 30 and, thus, form therebetween an opening 44 elongated in a longitudinal direction of the support structure 30. The core members 42 and 42' are positioned laterally on both sides of the permanent magnets 40 and 40', which are accordingly movable longitudinally within the elongated opening 44 thus formed between the core members 42 and 42'. Each of the permanent magnets 40 and 40' has its opposite lateral end faces slightly spaced apart substantially equally from the respective inner lateral ends of the core members 42 and 42' and forms an air gap between one lateral end face of each of the magnets 40 and 40' and the inner side end of one of the core members 42 and 42' and an air gap between the other lateral end of each magnet and the inner side end of the other core member. Each of the core members 42 and 42' preferably has a rectangular cross section as shown and, thus, the above mentioned inner side end of each core member is constituted by the flat inner side face of the core member. For the reason to be explained later, the rectangular cross section of each of the core members 42 and 42' is preferably such that the measurement of the cross section in a direction parallel with the magnetic axes of the permanent magnets 40 and 40' is larger than the measurement of the cross section perpendicular to the former, viz., to the measurement of the cross section in a vertical direction of the core member. The permanent magnets 40 and 40' thus arranged with respect to the magnetic core members 42 and 42' are assumed to have south poles at their respective lateral end faces adjacent to the inner side face of the core member 42 and north poles at their respective lateral end faces adjacent to the inner side face of the core member 42', as indicated at S and N on each of the magnets 40 and 40'.

The magnetic core members 42 and 42' are held in place on the support structure 30 by means of spacer elements 46 and 46' secured to upper end faces of the end plates 32 and 32', respectively, of the support structure 30 by suitable fastening means such as screws 48. The core members 42 and 42' are secured at their longitudinal ends to these spacer elements 46 and 46' by suitable fastening means such as screws 50 as shown. The above mentioned opening 44 formed between the core members 42 and 42' is closed at its longitudinal ends by the spacer elements 46 and 46'. Each of the spacer elements 46 and 46' is preferably constructed of a non-magnetic material such as aluminum or a plastic resin.

A control coil 52 is helically wound on and around the magnetic core member 42 and is connected at the opposite ends thereof to lead wires 54 and 56 and, likewise, a control coil 52' is helically wound on and around the magnetic core member 42' and is connected at the opposite ends thereof to lead wires 54' and 56'. The coils 52 and 52' are wound in opposite directions to each other as indicated by arrows on the coils and have equal numbers of turns on the magnetic core members 42 and 42', respectively. The combination of the magnetic core member 42 and the control coil 52 thereon and the combination of the magnetic core member 42' and the control coil 52' thereon respectively constitute stationary linear armatures which are to coact with a field magnet unit constituted by the permanent magnets 40 and 40' on the movable unit 38. The respective lead wires 54 and 54' of the control coil 52 and 52' forming part of these armatures are connected to positive terminals 58 and 58', respectively, and the respective lead wires 56 and 56' of the coils 52 and 52' are connected to negative terminals 60 and 60', respectively, for further connection to a suitable source (not shown) of signal current.

In the arrangement herein shown, each of the control coils 52 and 52' is wound on each of the magnetic core members 42 and 42' in a direction in which a current to flow from the positive terminal 58 or 58' to the negative terminal 60 or 60' flows upwardly in its portions on the inner side face of the magnetic core member. When, therefore, a voltage is built up between the positive and negative terminals 58 and 60 of the lead wires 54 and 56 connected to the control coil 52, a magnetomotive force directed leftwardly of the core member 42 in the shown position is produced in the coil 52 by the interaction between the constant flux field extending from the core member 42 into the south-pole end portion of each of the permanent magnets 40 and 40' through the air gap therebetween and the variable control field induced by the current which transversely cuts across the constant flux field. Similarly, a voltage built up between the positive and negative terminals 58' and 60' of the lead wires 54' and 56' connected to the control coil 52' produces a magnetomotive force directed also leftwardly of the core member 42' in the shown position by the interaction between the constant flux field extending from the north-pole end portion of each of the permanent magnets 40 and 40' into the magnetic core member 42' through the air gap therebetween and the variable control field induced bt the current which transversely cuts across the constant flux field. The control coils 52 and 52' being fast on the stationary core members 42 and 42', respectively, the magnetomotive forces thus produced in the two stationary armatures are reacted upon by the permanent magnets 40 and 40' on the movable unit 38 with the result that the movable unit 38 is caused to move rightwardly on the guide members 36 and 36' in the shown positions as indicated by arrow a while carrying the permanent magnets 40 and 40' through the opening 44 between the core members 42 and 42'. If the direction of the current to flow through each of the control coils 52 and 52' is reversed, the direction of the control field built up around each control coil is reversed and as a consequence the movable unit 38 is moved leftwardly on the guide members 36 and 36' in the shown positions as indicated by arrow b in FIG. 2. The control coils 52 and 52' are energized by currents of equal intensities so that substantially equal magnetomotive forces are produced in the coils 52 and 52'. Thus, the movable unit 38 is movable in the opposite directions of the arrows a and b on the guide members 36 and 36' without tending to skew with respect to the guide members 36 and 36' if the two stationary linear armatures coacting with the magnets 40 and 40' on the movable unit 38 are constructed similarly to each other.

When, furthermore, the control coils 52 and 52' are energized by currents which flow through the coils in the directions indicated by the arrows thereon, there appear south and north poles at the left ends of the magnetic core members 42 and 42', respectively, and north and south poles at the right ends of the core members 42 and 42', respectively, in the shown positions thereof, as indicated by S and N on each of the core members. As the movable unit 38 is moved closer to the left-hand end plate 32 of the support structure 30, therefore, each of the permanent magnets 40 and 40' on the movable unit 38 is subjected to increasing repulsive forces resulting from the magnetic fields thus appearing around the south-pole and north-pole end portions of the magnetic core members 42 and 42', respectively. As the movable unit 38 is moved closer to the right-hand end plate 32' of the support structure 30, each of the permanent magnets 40 and 40' on the movable unit 38 is subjected to increasing attractive forces resulting from the magnetic field appearing around the north-pole and south-pole end portions of the magnetic core members 42 and 42', respectively. If the two armatures are constructed similarly to each other and are supplied with equal currents as above noted, the repulsive forces exerted on the permanent magnets 40 and 40' on the movable unit 38 moved closer to the end plate 32 will be cancelled by each other in lateral directions of the armatures and, likewise, the attractive forces exerted on the permanent 40 and 40' on the movable unit 38 moved closer to the end plate 32' will be cancelled by each other in lateral directions of the armatures. The movable unit 38 is thus subjected only to a frictional force resulting from the weights of the movable unit 38 and the magnets 40 and 40 carried thereon and is enabled to smoothly move on the guide members 36 and 36' without being affected by the magnetic fields produced around the opposite end portions of the magnetic core members 42 and 42' throughout operation of the linear-motion device.

Figure 3:
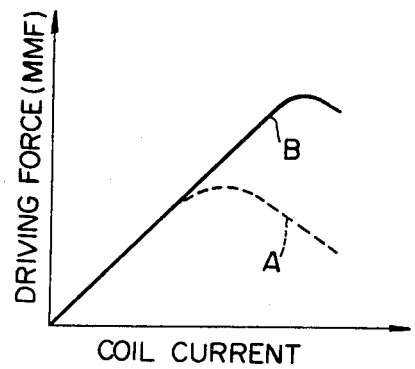
FIG. 3 is a graph showing the relationship between a current supplied to the stationary armatures and the resultant driving force imparted to the magnet-carring movable unit in each of a linear-motion device having the armatures arranged to form a closed magnetic circuit (curve A) and a linear-motion device having the armatures arranged to form open magnetic circuits (curve B)

If, on the other hand, the end plates 32 and 32' of the support structure 30 and the spacer elements 46 and 46' holding the magnetic core members 42 and 42' in position on the support structure 30 are constructed of magnetic materials, the magnetic core members 42 and 42' and the spacer elements 46 and 46' form a closed magnetic circuit. Only a limited amount of leakage flux is available by such a closed magnetic circuit and as a consequence the magnetic core members 42 and 42' tend to be magnetically saturated when currents are passed to the control coils 52 and 52' thereon. The driving or magnetomotive force imparted to the movable unit 38 when the magnetic core members 42 and 42' thus form part of a closed magnetic circuit is indicated by curve A in FIG. 3. If the end plates 32 and 32' and the spacer elements 46 and 46' are formed of non-magnetic materials as previously noted, the magnetic core members 42 and 42' are magnetically insulated from each other and lessen their tendencies to be magnetically saturated. An increased driving or magnetomotive force is thus imparted to the movable unit 38 as indicated by curve B in FIG. 3 when the magnetic core members 42 and 42' are magnetically isolated from each other by the end plates 32 and 32' and the spacer elements 46 and 46' constructed of non-magnetic materials.

Figure 4:
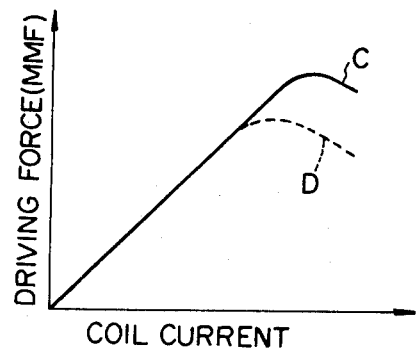
FIG. 4 is a graph showing a similar relationship in each of a linear-motion device in which the magnetic core member forming part of each of the armatures has a laterally elongated rectangular cross section (curve C) and a linear-motion device in which the magnetic core member forming part of each of the armatures has a square-shaped cross section (curve D).

If, furthermore, the magnetic core members 42 and 42' have relatively large inner side faces, the magnetic coupling between the core members 42 and 42' is intensified so that the core members 42 and 42' also tend to be saturated when currents are passed to the control coils 52 and 52' thereon. If, therefore, the cross sectional areas of the magnetic core members 42 and 42' are maintained unchanged, it is advantageous that the measurement of each of the core members 42 and 42' in a vertical direction of the core member be larger than the measurement of the core member in a lateral direction thereof. It is, for this reason, preferred that each of the magnetic core members 42 and 42' have a cross section which is elongated in a lateral direction of the core member. In FIG. 4, curve C shows the driving or magnetomotive force to be imparted to the movable unit 38 when each of the magnetic core members 42 and 42' has such a cross section and curve D shows the driving or magnetomotive force imparted to the movable unit 38 when each of the magnetic core members in use with the movable unit has a square-shaped cross section.

What is claimed is:

1. An electromagnetic linear-motion device, comprising at least one longitudinally elongated guide member; a movable unit mounted on the guide member and movable longitudinally of the guide member; a field magnet unit securely mounted on the movable unit; a pair of magnetic core members longitudinally elongated substantially in parallel with said guide member and spaced apart from each other to form an air gap between the field magnet unit and each of the core members; and coils helically wound in opposite directions to each other on said magnetic core members, respectively.

2. An electromagnetic linear-motion device as set forth in claim 1, further comprising at least one spacer element interposed between said magnetic core members and interconnecting the core members with one another.

3. An electromagnetic linear-motion device as set forth in claim 2, in which said spacer element is constructed of a non-magnetic material.

4. An electromagnetic linear-motion device as set forth in any one of claims 1, 2 and 3, in which said field magnet unit has a magnetic axis substantially transverse to the longitudinal direction of said magnetic cores and in which each of the magnetic core members has a rectangular cross section which is elongated in a direction parallel with the magnetic axis of the field magnet unit.

* * * * *